(12) United States Patent
Lidstrom et al.

(10) Patent No.: US 8,626,772 B2
(45) Date of Patent: Jan. 7, 2014

(54) DOUBLE WEIGHTED CORRELATION SCHEME

(75) Inventors: Mattias Lidstrom, Stockholm (SE); Jonas Bjork, Stockholm (SE); Joakim Soderberg, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 175 days.

(21) Appl. No.: 13/121,214

(22) PCT Filed: Sep. 29, 2008

(86) PCT No.: PCT/SE2008/051096
§ 371 (c)(1),
(2), (4) Date: Mar. 28, 2011

(87) PCT Pub. No.: WO2010/036164
PCT Pub. Date: Apr. 1, 2010

(65) Prior Publication Data
US 2011/0179043 A1    Jul. 21, 2011

(51) Int. Cl.
*G06F 7/00*    (2006.01)
(52) U.S. Cl.
USPC ........... 707/748; 707/749; 707/752; 707/776; 707/780
(58) Field of Classification Search
None
See application file for complete search history.

(56) References Cited

U.S. PATENT DOCUMENTS

2006/0136589 A1* 6/2006 Konig et al. ................. 709/224
2006/0190225 A1* 8/2006 Brand ............................. 703/2

FOREIGN PATENT DOCUMENTS

EP    1903460 A1    3/2008

OTHER PUBLICATIONS

Author: Chunhui Piao, Jing Zhao, Jun Feng; Title: Research on Entropy-based Collaborative Filtering Algorithm; Date: Oct. 2007; Publisher: IEEE; Pertinent pp. 213-220 (as attached pdf file).*
Author: Anna Huang; Title: Similarity Measures for Text Document Clustering; Date: Apr. 2008; Publisher: NZCSRSC; Pertinent pp. 49-56 (as attached pdf file).*
Piao, C., et al., "Research on Entropy-based Collaborative Filtering Algorithm", 2007 IEEE International Conference on E-Business Engineering (ICEBE 2007), Oct. 24-26, 2007, Hong Kong, pp. 213-220, XP031190099.
McLaughlin, M. et al., A Collaborative Filtering Algorithm and Evaluation Metric that Accurately Model the User Experience, Proceedings of the 27th Annual International ACM SIGIR Conference on Research and Development in Information Retrieval (SIGIR '04), Jul. 25-29, 2004, Sheffield, South Yorkshire, UK, 2004, pp. 329-336, XP002521918.

(Continued)

*Primary Examiner* — Anh Tai Tran
(74) *Attorney, Agent, or Firm* — Rothwell, Figg, Ernst & Manbeck, P.C.

(57) ABSTRACT

A method is provided for determining a correlation between a reference user and another user on the basis of two sets of ratings, where each rating is associated with a respective user. In response to a trigger, user ratings associated with the reference user and user ratings associated with the other user are collected, and all co-rated items of these two sets are correlated in the basis of an adjusted cosine correlation function which is weighted by a first and a second weighting function. The correlation is then stored and may be repeated for a plurality of users. The stored correlations may be used e.g. for ranking purposes.

12 Claims, 7 Drawing Sheets

(56) References Cited

OTHER PUBLICATIONS

Baltrunas, L., et al. "Dynamic Item Weighting and Selection for Collaborative Filtering", Proceedings of the Workshops: Prior Conceptual Knowledge in Machine Learning and Data Mining and Web Mining 2.0 (PRICKL '07 & Web Mining 2.0), Sep. 21, 2007, Warsaw, Poland, [Online] 2007, 12 pages, XP002521919.

Sandvig, J.J., et al., "Impact of Relevance Measures on the Robustness and Accuracy of Collaborative Filtering", Lecture Notes in Computer Science—Proceedings 8th International Conference on E-Commerce and Web Technologies (EC-Web 2007), Sep. 3-7, 2007, Regensburg, Germany, vol. 4655, 2007, pp. 99-108, XP019099024.

Breese, J.S., et al. Empirical Analysis of Predictive Algorithms for Collaborative Filtering, Proceedings of the Fourteenth Conference on Uncertainty in Artificial Intelligence, Jul. 1998, Madison, WI, USA, Jul. 24, 1998, pp. 43-52, XP002278494.

Vozalis, E., et al., "Analysis of Recommender Systems' Algorithms", Proceedings of the 6th Hellenic European Conference on Computer Mathematics and its Applications, Sep. 25-27, 2003, Athens. Greece, [Online] 2003, 14 pages, XP002521920.

\* cited by examiner $$R = \begin{matrix} & i_1 & i_2 & \cdots & i_n \\ u_1 & R_{1,1} & R_{1,2} & \cdots & R_{1,n} \\ u_2 & R_{2,1} & R_{2,2} & \cdots & R_{2,n} \\ \vdots & \vdots & \vdots & \vdots & \ddots \\ u_m & R_{m,1} & R_{m,2} & & R_{m,n} \end{matrix}$$

DOUBLE WEIGHTED CORRELATION SCHEME

CROSS-REFERENCE TO RELATED APPLICATION

This application is a 35 U.S.C. §371 National Phase Entry Application from PCT/SE2008/051096, filed Sep. 29, 2008, and designating the United States.

TECHNICAL FIELD

The present invention relates generally to a method for executing correlation on the basis of an improved correlation scheme, and an apparatus for executing such a correlation scheme.

BACKGROUND

There are many situations where it is useful to be able to distinguish and interpret patterns in data sets and to be able to use such a pattern for selecting or ranking a set of items or users. In a typical situation, automatic predictions of different users interests or preferences may be used for obtaining some kind of ranking or intelligent selection between a range of alternatives. Such predictions typically rely on collected information which is filtered, using some filtering mechanism, and on the underlying assumption that those users who had a similar taste in the past often tend to agree also in the near future. This principle may be used for various recommendation systems where preferences of a number of users having a similar "preference pattern" as a reference user may be useful for recommending a selection of items to the reference user. Such a recommendation system, may typically be directed to music, movies, restaurants travelling destinations, etc.

Collaborative filtering is one of the most successful methods used in present product recommendation systems. The collaborative filtering concept is heavily based on finding correlations between users or items. The methods normally used to find these correlations typically refer to traditional distance and vector correlation measures, such as e.g. the Cosine correlation method, the Adjusted cosine correlation method, the Pearson correlation method, and the Spearman correlation method. When using any of the mentioned measures, a correlation is derived in the interval $[-1,1]$, where $-1$ represents a decreasing linear relationship, while 1 represents an increasing linear relationship between correlated items or users. The higher the absolute correlation value, the stronger the correlation between the users or items is.

A correlation between two independent users or items will result in perpendicular vectors and a correlation which equals 0. Variables which have correlation 0 are, however, not necessarily independent. Since the described correlation coefficients only detect linear dependencies, it may therefore be difficult to interpret a result in a correct and reliable way in this type of situations.

Figure 1:
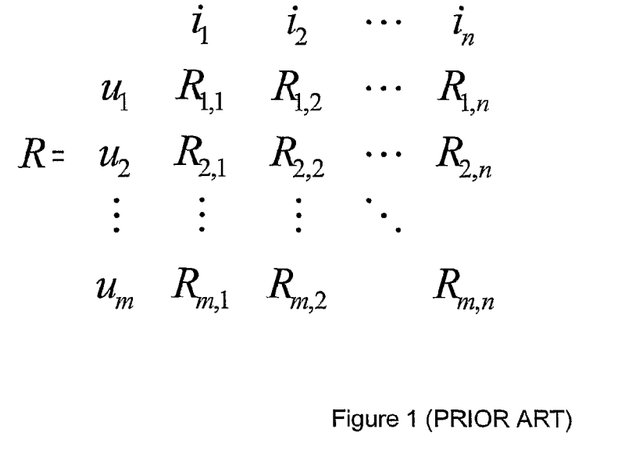
FIG. 1 is an exemplary illustration of a user-item matrix R, for storing ratings of n items associated with m users, or vice versa, according to the prior art.

In collaborative filtering the data to be processed is typically represented by a user-item matrix, R, as illustrated with FIG. 1. In the figure matrix R comprises rating data, typically provided from m users, $u_1 \ldots u_m$, where each user is represented by a row-vector, $i_1 \ldots i_n$, in an n-dimensional space capable of covering n items. For each of the items in the matrix a rating, $R_{1,1} \ldots R_{m,n}$, respectively, can be specified by a respective user, where each item in the matrix is represented by a column-vector in an m-dimensional space. In a typical scenario each position in the matrix will either comprise a rating that has been given to the respective item by a specific user, or be blank, for the occasion that the user for some reason has not rated that particular item. From hereinafter, this document will refer only to correlations between users. It should, however, be obvious to any person skilled in the art that correlations between users only is given as one possible exemplification, and that also the alternative approach of instead performing correlations between different items may be applicable in a corresponding way.

An example of a vector representation of a user which has given a number of ratings for a specific series of items is illustrated below, where a user, k, has given certain items, e.g. some watched films, out of a series, $i_1 \ldots i_n$, of items available for rating, a rating on a predefined scale. In this case the scale is a 1 to 5 scale, where 1 may represent the lowest rate, and 5 the highest rate. Items 1, 3 and n−1 have not been rated at all, and, thus are left blank.

| | $i_1$ | $i_2$ | $i_3$ | $i_4$ | $i_5$ | ... | $i_{n-1}$ | $i_n$ |
|---|---|---|---|---|---|---|---|---|
| k | | 5 | | 4 | 3 | | | 2 |

By correlating user vectors associated with two respective users, two by two, the users that have the most similar taste, or which have the taste that differ the most between each other, may be identified. Once identified this information may be used, e.g. for ranking and for recommending additional items to the user at focus, on the basis of the ranking.

However, only the correlations between co-rated items, i.e. those items for which both users have given a rating, can be used in the calculations for obtaining a measure of the interrelationship between the two users. Such a set of co-rated items can be denoted by:

$$|i \in I_u \cap I_v| \qquad (1)$$

Often the group of co-rated items is relatively small compared to the whole set of items, i.e. only a limited number of items which can be rated have actually been rated by a user. A situation, where the executed correlations are based on a relatively small set of data, may imply a false linear dependency, and, thus, an incorrect indication of corresponding, or deviating, user preferences in the particular field considered.

Even though each one of the different correlation methods mentioned above have their own strength of finding correlations between users, they all also have their weaknesses, which make it difficult to choose an overall suitable correlation method or scheme which will give a reliable result for a wide variety of possible scenarios. Tests show that all of the mentioned correlation methods tend to be more or less inaccurate when the Euclidean distance between at least some of the co-rated items of two vectors is large, or in other words, when one or a few co-rated items deviate from the majority of co-rated items. Inaccuracy also appears in many situations where a sparse set of rated items are correlated. As already mentioned the different correlation methods known from prior art solutions only find and use linear correlations between the users or items.

SUMMARY

The object of the present invention is to address at least some of the problems outlined above. In particular, it is an object to provide a solution which enables more reliable collaborative filtering of different users or items.

According to one aspect, a method of determining a correlation between a reference user and another user on the basis of two sets of ratings each associated with the respective user is provided.

Upon recognising a trigger for determining a correlation between the two users, a first set of user ratings associated with the reference user, and a second set of user ratings associated with the other user are collected and all co-rated items of these two sets are identified as a set of co-rated user-pairs for the two users. For the set of co-rated user-pairs a correlation is then calculated on the basis of an adjusted cosine correlation function, which is weighted by a first and a second weighting function. The first weighting function has the main purpose of compensating for the Euclidean distance of the respective set of ratings while the second weighting function has the main purpose of compensating for high correlations in case the set of co-rated user-pairs is a small set. Once the correlation has been calculated, the result is stored.

The suggested correlation procedure may be repeated for a first reference user, u and a plurality of other users, $v_1 \ldots v_n$, where $n \geq 2$, such that the collecting step comprises collecting a set of user ratings for each of the other users, and such that the calculating step and the storing step are repeated for each set of co-rated user pairs. The result obtained from a repeated correlation procedure may be used for ranking the users, $v_1 \ldots v_n$, on the basis of the correlations.

The correlation procedure may be initiated from any of a PC, a laptop, a PDA, a set-top box, or a mobile telephone.

According to another aspect, an arrangement of a communication network which is adapted to execute the suggested method is also provided.

The suggested method is an overall applicable scheme, which is suitable for handling correlations in various situations where there is a considerable risk that other correlation schemes will fail, or give an unreliable result. The suggested correlation scheme takes the number of items that the calculations are actually based upon into consideration, thereby abolishing the high correlations that other correlation schemes tend to indicate for small sets of co-rated items.

In addition, the suggested correlation scheme will not only take into consideration whether two users have similar deviations compared to the general public's opinion, but also whether or co-rated items deviate from each other.

These objects and others can be achieved primarily by a solution according to the appended independent claims.

Further features and benefits of the present invention will become apparent from the detailed description below.

BRIEF DESCRIPTION OF THE DRAWINGS

The present invention will now be described in more detail by means of exemplary embodiments and with reference to the accompanying drawings, in which.

DETAILED DESCRIPTION

Briefly described, a new correlation scheme is suggested, and more specifically a double weighted correlation scheme is suggested which better compensates both for one or a few ratings that deviate a lot from an otherwise relatively similar pattern, as well as for deficiencies due to correlations made on the basis of a small data set or co-rated items or users.

As already mentioned above, correlation schemes used today only take a small amount of information that is available and needed into consideration in the correlation computations. The conventional Adjusted cosine correlation method computes the correlation between the deviations of two users, using the items average ratings as a reference. In those cases where the user preferences of two users deviate "in the same direction" this may be a good approach, since a result of a correlation in such a scenario will indicate that the respective users have similar preferences. The more the two users deviate from the item averages the higher the correlation will be. A deficiency with such a scheme is, however, that it fails to consider also the deviation between the two user's ratings, and, thus, the result of a correlation may give a false indication of the user's relative preferences. If for example an item's average rating on a scale from 1 to 5 is 1.9 and one user has rated a respective item 2, while another user has rated a 5 for the same item, both users deviate in the same direction from the item average, while one of them even deviate a lot. As a result, this particular example will indicate a high correlation between the two users. It is, however, obvious that these two users did not have a similar opinion about the rated item. This is one reason why a modified adjusted cosine correlation method, which takes also this type of information into consideration, is required. In order to overcome, or at least diminish, at least some of the deficiencies mentioned above a weighted adjusted cosine scheme, which will be described in further detail below, is suggested.

According to the conference paper "An open architecture for collaborative filtering of netnews", Jonathan L. Herlocker et al, CSCW '94:Proceedings of the 1994 ACM conference on computer supported cooperative work, pages 175-186, New York, USA, 1994, the Pearson correlation scheme is a scheme that is robust with respect to differences of interpretation of the used rating scale. Assume for example that two users are perfectly correlated. If one user rates a number of items between 1 and 3, and another user rates the same items between 3 and 5, a prediction of 3 for the first user will result in a prediction of 5 for the second. If one of the users uses the grading scale in increasing order and the other in decreasing order, that is, one user interprets the highest rating as 5, while the other user interprets the highest rating as 1, the users will be negatively correlated. This means that a 5 from the first user will result in a 1 for the second. This property might be desirable in a recommendation system used internationally where different cultures have different perceptions of the rating scale. However, unless the users have the same perception in such a scenario, the computed strong correlation between the users will most likely be false. The idea of the suggested method is therefore to create a combined weighting correlation scheme in order to diminish at least some of the weaknesses described above.

In order to be able to compare how the ratings for a set of co-rated items for a first user, u, and a second user, v, respectively, deviate from the average rating of an item, each item's average rating is subtracted from each rating of the set. Multiplying the user's deviations with each other will result in a positive result if they deviate in the same direction, while it will result in a negative result otherwise. The result from multiplying the deviations with each other will also be greater, the greater the deviations are.

What has been described so far is a correlation executed using the regular Adjusted cosine correlation method. A major drawback with this method is, however, that it only considers the linear dependency between the two correlated users, neglecting to recognise also the Euclidean distances of the two ratings. This deficiency can be diminished by introducing a first weighting function into the conventional adjusted cosine correlation scheme. In order to be able to compensate for correlations made on the basis of a small set of data, also a second weighting function is introduced, resulting in the following double weighted adjusted cosine correlation method:

$$\text{corr}_1(u, v) = \frac{\sum_{i \in I_u \cap I_v} w_1(u,v)(R_{u,i} - \overline{R_i})(R_{v,i} - \overline{R_i})}{\sqrt{\sum_{i \in I_u \cap I_v} w_1(u,v)(R_{u,i} - \overline{R_i})^2 \sum_{i \in I_u \cap I_v} w_1(u,v)(R_{v,i} - \overline{R_i})^2}} \cdot w_2(u,v) \quad (2)$$

where the weighting function, $w_1(u,v)$ is defined as:

$$w_1(u,v) = \alpha^{(\delta-\gamma)|R_{u,i} - R_{v,i}|} \quad (3)$$

where $\alpha$ is a scaling factor greater than one, which is chosen on the basis of the desired scaling factor between the reduced items and the enhanced items. A typical value of $\alpha$ is two. $\delta$ is the average divergence of all Euclidean distances of the respective data set of co-rated items, i.e. of $|R_{u,i} - R_{v,i}|$, while $\gamma$ is a parameter indicating the median of all possible divergences of the correlated data set.

In an exemplified scenario where the rates for a certain category of items may be given in a range from 1 to 5, the possible values of the Euclidean distances are any of {0,1,2,3,4}. In this case $\gamma$ will be equal to 2. If instead the possible rates range from 1 to 10, with all possible values of the Euclidean distance given as {0,1,2,3,4,5,6,7,8,9}, $\gamma$ will instead be equal to 4,5. The second weighting function, $w_2$ is defined as:

$$w_2(u,v) = 1 - \frac{1}{|i \in I_u \cap I_v|} \quad (3)$$

The main purpose with $w_2$ is to compensate for high correlations that may be based on a small set of co-rated items. A consequence of the second weighting function is that the correlation's interval will change to $[-1,1]$, since the result of this function will be a limit value that converges towards the original correlation as the set of co-rated item increases towards infinity, i.e. the larger the set of co-rated items is, the smaller compensational effect $w_2$ will have on the correlation, and vice versa.

There will be three different cases for the weighting function $w_1$, namely:

1. $\delta < \gamma$

This case is an indication that the preferences of the two correlated users are relatively similar. In such a situation ratings close to each other will be enhanced, while ratings far from each other will be reduced by the weighting factor. The smaller the average of all Euclidean distances is, the greater the enhancement will be.

2. $\delta = \gamma$

This is an indication that two correlated users have similar preferences for about half of the items and opposite preferences for the other half. The correlation will therefore be un-weighted, with regard to $w_1$, i.e. $w_1$ will be set to 1, and hence the result of the correlation will be equal to the regular adjusted cosine correlation method, possibly adjusted by $w_2$.

3. $\delta > \gamma$

This situation indicates that the correlated user's preferences to a large extent are opposite to each other. In such a situation, ratings far from each other will be enhanced, while ratings close to each other will be reduced.

The weighting function $w_1$ ensures that the factors between the reduced and the enhanced items are symmetric with respect to $\gamma$. In one of the scenarios, exemplified above, where the rating ranged between 1 and 5, and hence $\gamma=2$, the maximum enhancement and reduction will occur at the two extremes, where $\delta$ is either 0 or 4 ($\gamma \pm 2$). If $\delta=0$ all items with equal ratings will have a weighting factor that equals $\alpha^0$, i.e. $w_1=1$, while for ratings that have a maximal difference, i.e. a difference of 4, the weighting factor will be $\alpha^{-8}$. Consequently, the scaling factor between the most enhanced and the most reduced item will equal to $\alpha^8$.

If $\delta=4$, the items with equal ratings will also have a weighting factor that equals $\alpha^0=1$, while ratings that that have a maximal difference, i.e. 4, will have a weighting factor that equals $\alpha^8$. The scaling factor is therefore $\alpha^8$ between the most enhanced and the most reduced item also in this case. The same symmetry applies for all values of x if $\gamma \pm x$, where $0 \le x \le 2$. The procedure described above illustrates how the correlation between two users, u and v can be calculated using a double weighted correlation scheme.

In a typical scenario, it is of interest to obtain a correlation measure between a reference user u and a plurality of other users, $v_1 \ldots v_n$. Once a correlation has been computed for each user pair, i.e. for user pair u and $v_1$, u and $v_2$, ... u and $v_n$, the resulting correlation values may be used e.g. for ranking users $v_1$ to $v_n$ and for determining which users have the most similar preferences with regard to a specific set of items as the reference user, u. Such a procedure can be achieved by repeating the described correlation procedure once for all users $v_1$ to $v_n$, where each respective set of co-rated user pairs are correlated one co-rated user pair at a time. The repeated correlations will result in a correlation vector, V[$\text{corr}_1(u,v_1)$ ... $\text{corr}_n(u,v_n)$] which gives an indication of the respective correlation between user u and each other user $v_1$ to $v_n$. The correlation vector, V may then be used for ranking the users in a required manner, e.g. such that the highest correlations are given the highest rankings, i.e. such that the users who's preferences are most similar to the ones of the reference user u for a respective type of items will be considered when other types of items are to be recommended to user u.

The modified correlation scheme described above may be used in a number of situations where it is a desire to obtain a reliable indication of the correlation between co-rated items or users, no matter if the correlated data set is large of small. The correlation scheme may then be used e.g. in a recommendation system, which may be adapted to offer a recommendation service to users.

In order to execute the method described above a device for performing the suggested correlation method has to be adapted accordingly. The device may be a standalone device, adapted to execute the suggested double weighted correlation method on the basis of data provided from one or more databases, upon receiving a trigger from an external device, such as e.g. a triggering or a recommending device.

Alternatively such a device may be provided as an integrated part of a complete correlation or recommending system, which may comprise e.g. storage facilities and triggering means that are normally required for initiating a correlation process and for providing reliable correlation/rating data to a user.

Figure 2:
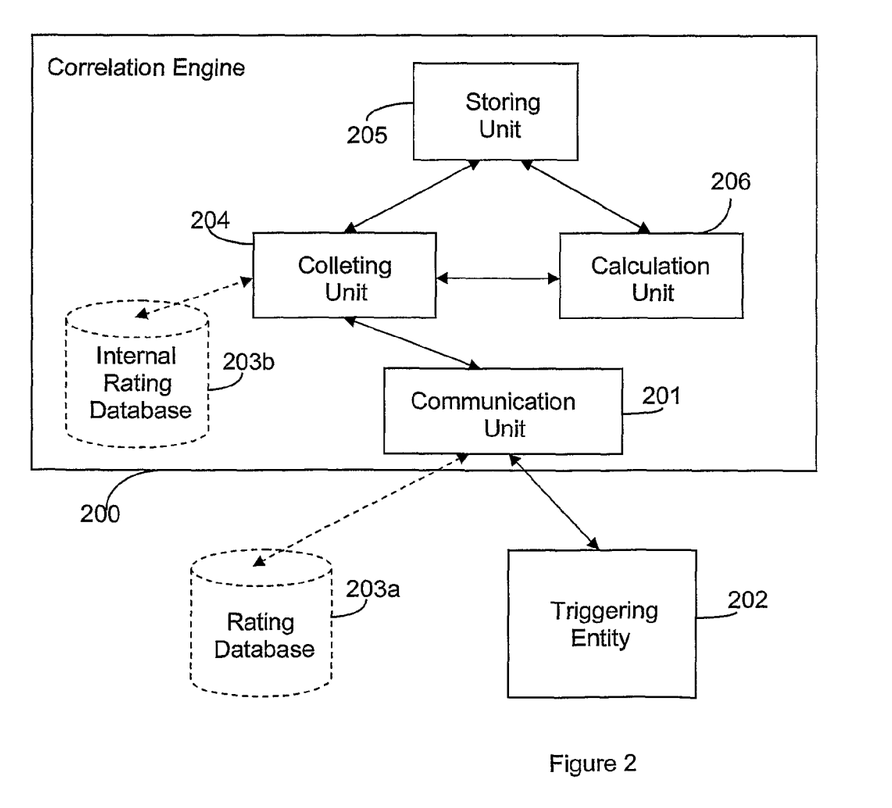
FIG. 2 is a schematic illustration of a correlation engine, according to one exemplary embodiment.

A correlation device according to one embodiment, here referred to as a correlation engine, will now be described in further detail with reference to FIG. 2. It is to be understood that the correlation engine described in FIG. 2 is a simplified illustration of a functional entity adapted for executing the correlation method suggested above, which only represents one possible implementation, and that a device providing the suggested functionality may be implemented in a variety of other alternative ways. It is also to be understood that although denoted correlation engine, the device may be referred to in a number of alternative ways, such as e.g. a predicting engine, especially if implemented as an integrated part of a correlation and/or rating entity.

As a final remark, only units providing functionality which is necessary for the understanding of the described correlation engine have been presented in the figure, thereby omitting any other commonly known units which are normally necessary for enabling this type of functional entity to operate and communicate in a normal manner in a conventional communication system.

The correlation engine 200 of FIG. 2 comprises a conventional communication unit 201 which enables the correlation engine 200 to be triggered to execute a correlation procedure by any type of external triggering entity 202, such as e.g. what us normally referred to as a Recommender. Via the communication unit 201 the correlation engine 200 can also communicate with one or more external databases, such as rating database 203*a*, from which rating data can be retrieved. Alternatively, the correlation engine 200 may instead comprise an internal rating database 203*b*. The rating data of any of the alternative rating databases 203*a,b* may have been provided to the respective rating database 203 from the respective users via any kind of conventional communication system and/or user interface (not shown).

The correlation engine 200 also comprises a collecting unit 204, which is adapted to collect relevant rating data either from the internal, or the external rating database 203*a*, 203*b*, in response to recognising a trigger message received from the trigger entity 202. The collecting unit 204 is also adapted to store collected rating data in a storing unit 205. Once the rating data has been retrieved and stored, the collecting unit 204 is adapted to initiate an execution of a correlation procedure at a calculating unit 206. The calculating unit 206 is adapted to respond to such a command by retrieving the relevant rating data from the storing unit 205, to execute a correlation for each co-rated user-pair identified in the trigger, and to store the result in the storing unit 205. The collecting unit 204 is also adapted to collect resulting correlations from the storing unit 205, once the correlation procedure is completed by the calculating unit 206. Such a procedure may e.g. be triggered by a notification which is sent from the calculating unit 206 to the collecting unit 204. The collecting unit 204 having access to a set of correlation results associated with a requested set of users is also adapted to provide this result to the requesting trigger entity 202, or to any other entity, thereby enabling the receiving entity to use the correlation results for further processing, such as e.g. for executing a ranking of the correlated set of users.

Figure 3:
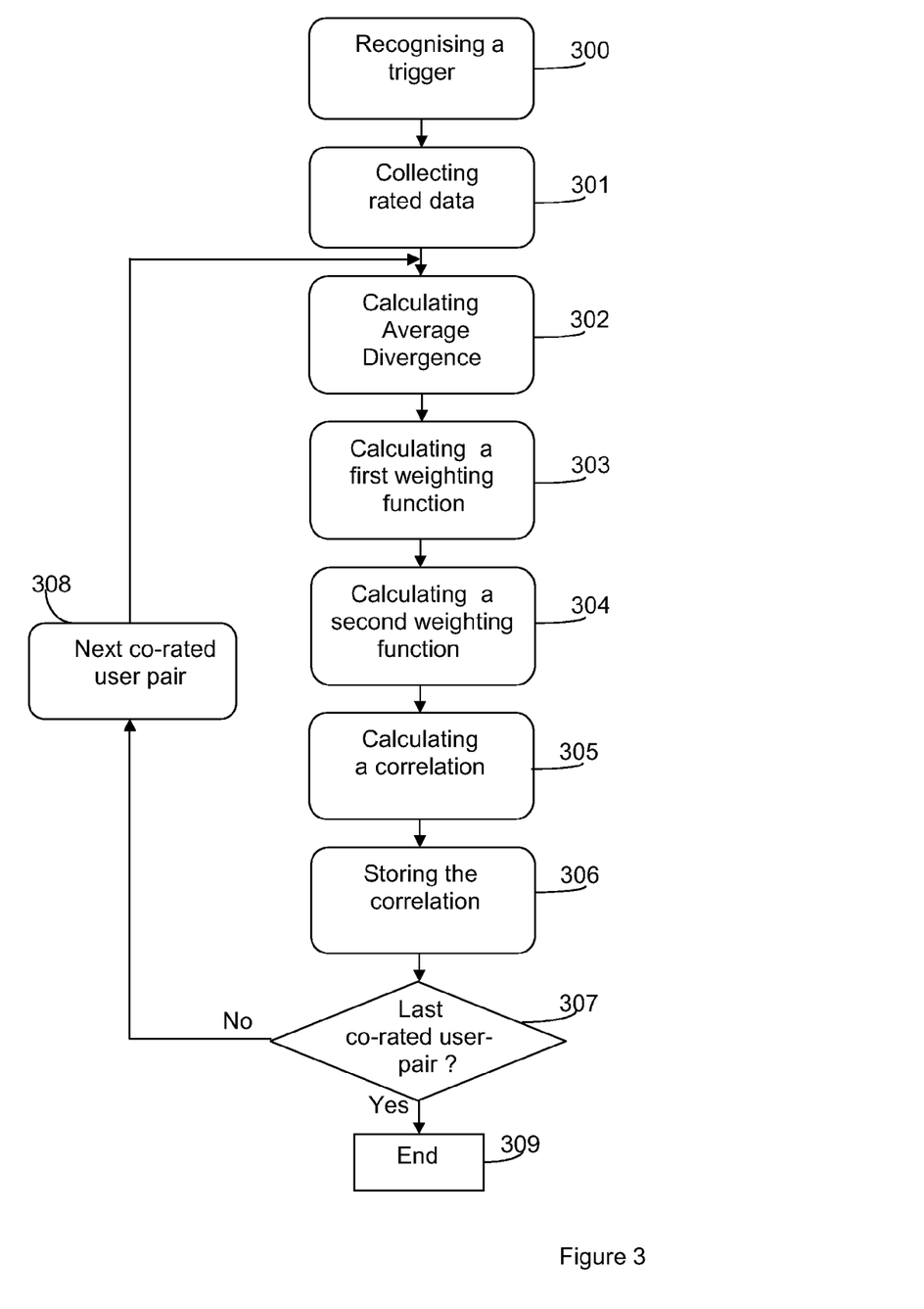
FIG. 3 is a flow chart illustrating an execution of a double weighted correlation according to one exemplary embodiment.

Execution of the described double weighted correlation method on an entity, such as the correlation engine described above, or on any other entity having corresponding functionality, can be described as the flow chart of FIG. 3, which will now be described in further detail below.

In a first step 300 the correlation engine receives or recognises a trigger which is configured to initiate a correlation procedure for a particular reference user. The trigger, typically originates from an external entity, but may alternatively originate from an internal process of the correlation engine, if it is part of an integrated system. In response to the trigger, the correlation engine collects and stores relevant rated data from an external or internal rating database, as indicated with another step 301.

In subsequent steps 302,303 and 304, the correlation engine calculates an average divergence, a first weighting function and a second weighting function, respectively, for a first co-rated user-pair. In a next step 305, a double weighted correlation is calculated for the co-rated user-pair, on the basis of the two weighting functions, one of which is dependent on the calculated average divergence. The resulting correlation is then stored in another step 306.

By repeating the described procedure for a plurality of users for which there are co-rated items available, a correlation result for each co-rated user pair will be obtained. Such a repeated process is illustrated with a step 307 and 308. Which users to consider in such a repeated procedure is typically indicated in the trigger, recognised in step 300.

Once a correlation has been calculated and stored for all relevant user-pairs, the correlation procedure is terminated, as indicated with a step 309. Whenever required, the stored correlations may then be retrieved from the storing means and used for any type of suitable computation and/or comparison, such as e.g. a ranking procedure.

Figure 4:
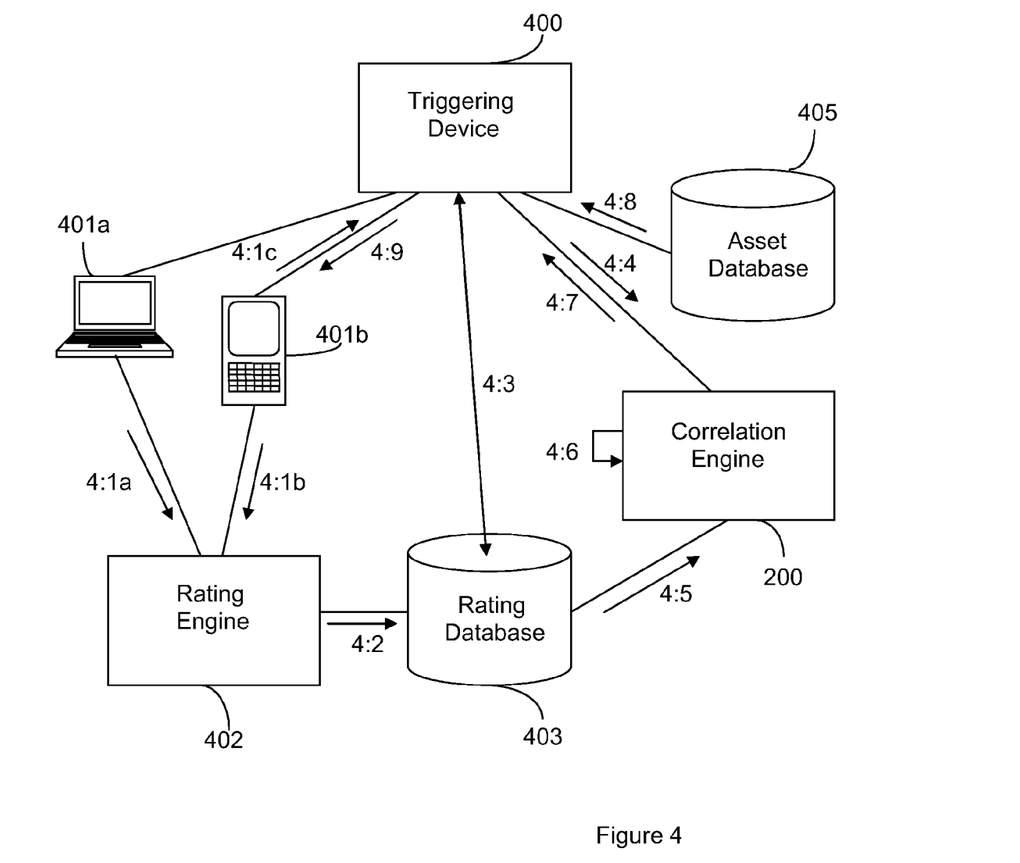
FIG. 4 is a schematic illustration of a system architecture, according to one exemplary embodiment, of a recommendation system which is based on a double weighted correlation scheme.

Without any limitation thereto, one example of a system architecture suitable for providing a recommending service to a number of users on the basis of a correlation engine and a correlation method, such as the one described above, will now be described with reference to FIG. 4. In addition to the previously described correlation engine 200, the described system architecture also comprises a triggering device 400, which may be equivalent to a Recommender if the described system is a recommender system.

The triggering device 400 is responsible for initiating an execution of the suggested correlation procedure according to any kind of predefined rules and constraints. Such rules may be dependent on one or more external or internal events. However, in its simplest form the triggering device may respond to a request sent from a user device. Two user devices, 401*a* and 401*b*, which may be any of e.g. a PC, a laptop, a PDA, a set-top-box and/or a mobile telephone, are adapted to use any of the services provided by the triggering device 400. Although the system of FIG. 4 is limited to two user devices, it is to be understood that this type of system normally is dimensioned to handle a large amount of user devices, and a vast number of users each of which may have access to correlation based services, such as e.g. recommending services, provided by the network. A rating engine 402 is used for collecting ratings provided by the connected users, via any kind of suitable application. Such an application may e.g. be a conventional voting application presented to the user on a TV screen, or a voting feature presented on a web page, e.g. in association with a web based purchase. In the described example the rating engine 402 stores the ratings in a rating database 403, typically as a matrix, as described above with reference to FIG. 1.

The system also comprises a database 405, here referred to as an Asset Database, for storing information about assets or items to be identified by a device, typically the triggering device 400, when making use of a result from the correlation procedure, e.g. for recommending items.

As an illustrative example of how the described system may operate, ratings of any type of asset or item, such as e.g. movies, music, restaurants or books, entered to the user devices 401*a* and 401*b* are provided to a rating engine 402 in the two steps 4:1*a* and 4:1*b*. In another step 4:1*c*, a request for a rating service is sent from user device 401*b* to the triggering device 400. Normally, rating information is continuously updated from a large number of different users. The rating engine 402 stores the rated data in one or more rating databases 403, as indicated with a next step 4:2. In another step 4:3, triggering device 400 is notified of the rating data, and in a subsequent step 4:4, the trigger device 400 initiates a correlation procedure at the correlation engine 200. The trigger, which will indicate for which users correlations are to be executed, may e.g. have been initiated manually by a user, as indicated in the present example, or automatically in response to any pre-configured process of the triggering device 400, or of any external device. In another step 4:5, relevant rated data is collected by the correlation engine 200 from the rating database 403, and in yet another step 4:6, the correlation procedure is repeatedly executed for each co-rated user pair and a resulting correlation value is stored for each of these user-pairs. Once a correlation has been calculated and stored for every co-rated user-pair identified by the trigger, the correlations are accessible for the trigger device 400. As indicated with a subsequent step 4:7, the result of the correlation is therefore provided to the triggering device 400, for further processing.

As exemplified with a next step 4:8, the triggering device 400 may use the correlations retrieved from the correlation engine 200 to rank users and to retrieve additional items from the asset database 405. In a final step 4:9, the result of a requested or scheduled service, e.g. a request for a recommended set of items, is provided to a respective reference user, in this case by forwarding the result to user terminal 401*b*. Alternatively, the result may be stored in a database or data record for later retrieval by a respective user or process.

As already mentioned, the double weighted correlation method described with reference to the examples above is an improvement of the well known and commonly used Adjusted cosine correlation scheme. The improved overall performance of such a correlation scheme will now be illustrated with reference to seven different scenarios, each of which are based on synthetic rating data for a group of users, illustrating an item average for all ratings and the specific ratings given by two users, where each figure is representing a typical rating pattern. Each one of FIGS. 5*a*-*g* describes a scenario which is based on ratings that has been given by the two users for ten different items. For each of these series of co-rated items, the corresponding result of correlations, based on the suggested double weighted correlation method and three alternative correlation methods, namely, the Cosine-, the Adjusted cosine and the Pearson method are presented and commented. In addition, a Single weighted method, i.e. the suggested correlation scheme, including the first weighting function, $w_1$, but omitting the second weighting function, $w_2$, here referred to as Single weight, has also been calculated.

Figure 5A:
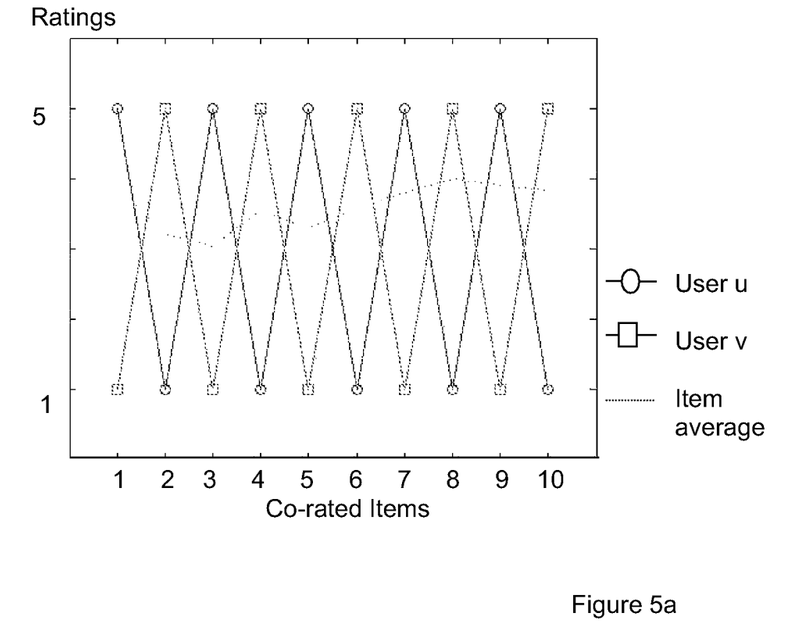
FIG. 5a-g is a series of diagrams illustrating exemplified correlations for a series of co-rated items derived by different correlation schemes in seven different rating-scenarios.

FIG. 5*a* refers to a first exemplified scenario where ratings given by two users having distinctive opposite preferences have been correlated. The result of the correlations given for the different measures are:

| | |
|---|---|
| Cosine | 0.3846 |
| Adjusted cosine | −0.7913 |
| Pearson | −1.0000 |
| Single weight | −0.7913 |
| Double weight | −0.7122 |

Since the users in this example have totally opposite preferences according to the given rates, it is obvious that a representative correlation measure for such a co-rated series should indicate towards the negative end of the correlation scale [−1,1]. As indicated in the list this is definitely obtained by the double weighted correlation scheme.

Figure 5B:
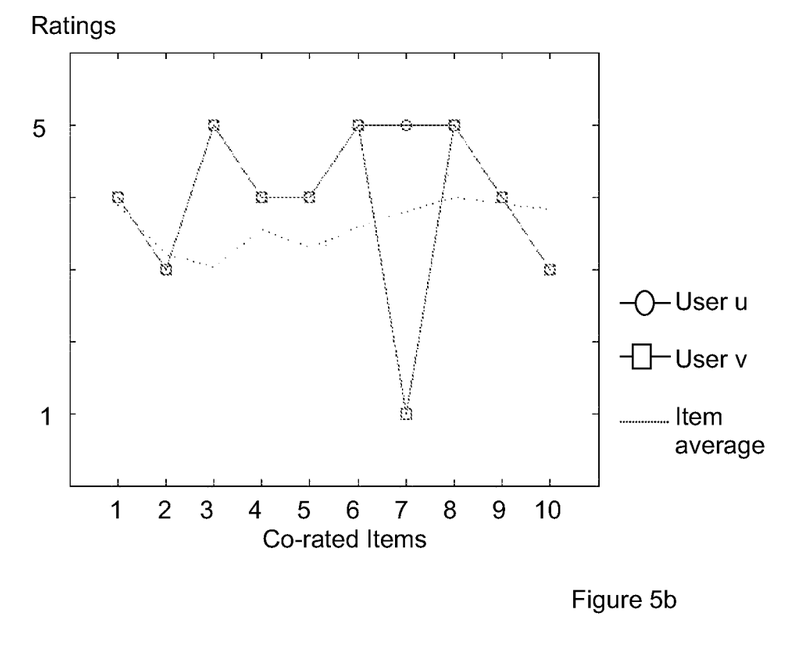

FIG. 5*b*, illustrates another scenario, where all but one of the given rates, namely the rate for co-rated item 7, are equal. This is a typical example of how equal ratings will be enhanced, while the opposite one will be reduced when using the double weighted correlation scheme. The results of the correlations for this co-rated set are:

| | |
|---|---|
| Cosine | 0.9553 |
| Adjusted cosine | 0.3962 |
| Pearson | 0.2750 |
| Single weight | 0.9887 |
| Double weight | 0.8899 |

In this example all the correlations addends that are based on equal preferences have been enhanced, while the correlation addend from item 7 has been reduced due to differences in preference, when correlating using the double weighted correlation scheme. A representative correlation value for this type of scenario should indicate a high positive value. This is achieved with the suggested double weighted correlation scheme.

Figure 5C:
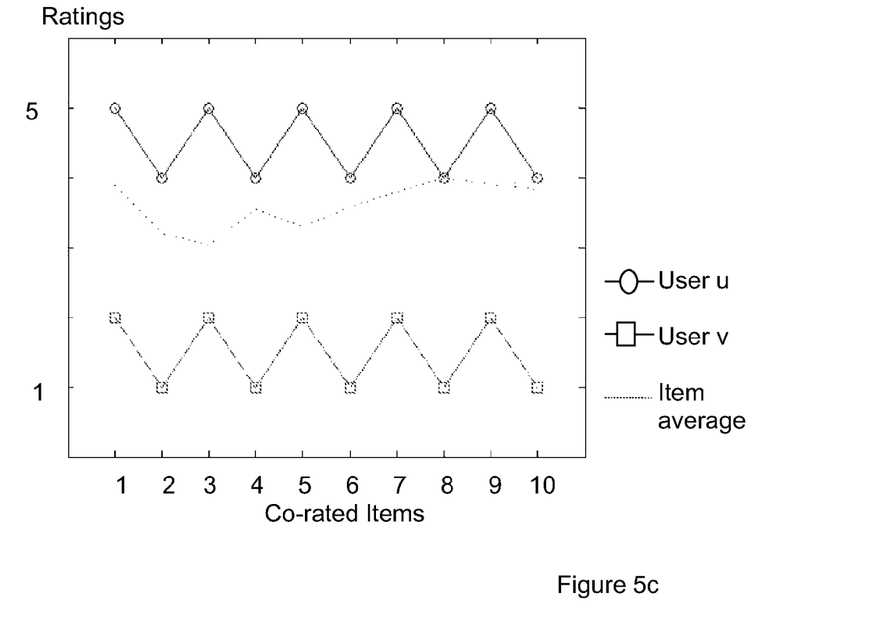

FIG. 5*c* shows yet another example, where the ratings given by the two users distinguish from each other in the sense that one user has consequently given high ratings, while the other user consequently has given low ratings for a series of co-rated items. For this example, the resultant correlations read as follows:

| | |
|---|---|
| Cosine | 0.9778 |
| Adjusted cosine | −0.6354 |
| Pearson | 1.0000 |
| Single weight | −0.6354 |
| Double weight | −0.5719 |

Since the users in the latest example consequently have different preferences regarding the rated items, representative correlation values should instinctively show a value towards the negative end of the correlation scale. Also in this example the double weighted correlation scheme gives a reliable result.

Figure 5D:
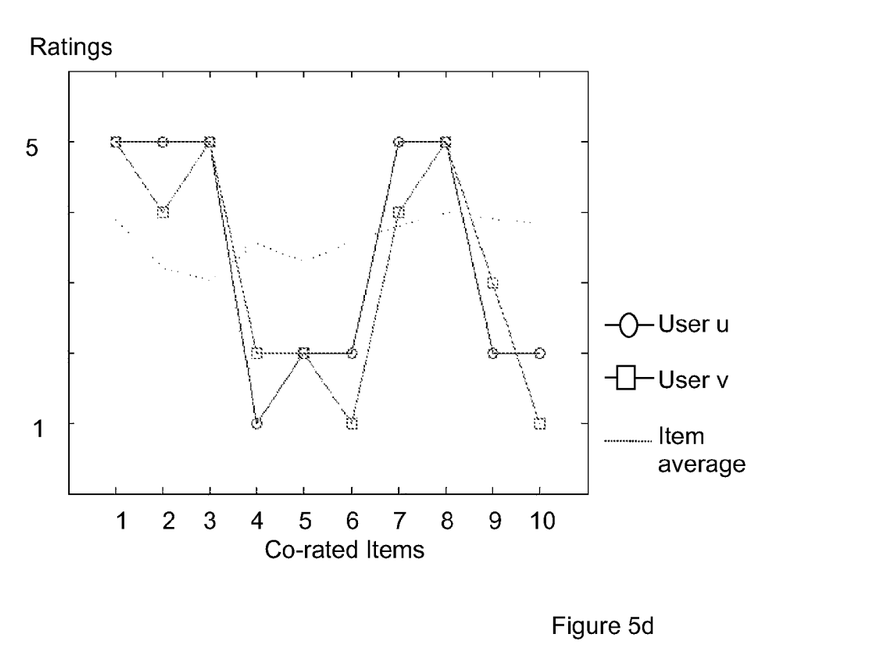

Another example, illustrated with FIG. 5*d*, instead shows a scenario where two users with similar preferences have given their rates for a set of co-rated items. The result of these correlations are:

| | |
|---|---|
| Cosine | 0.9794 |
| Adjusted cosine | 0.8911 |
| Pearson | 0.8894 |
| Single weight | 0.9257 |
| Double weight | 0.8332 |

In this case the correlations should show a high positive result, which is achieved also when using the double weighted correlation scheme.

Figure 5E:
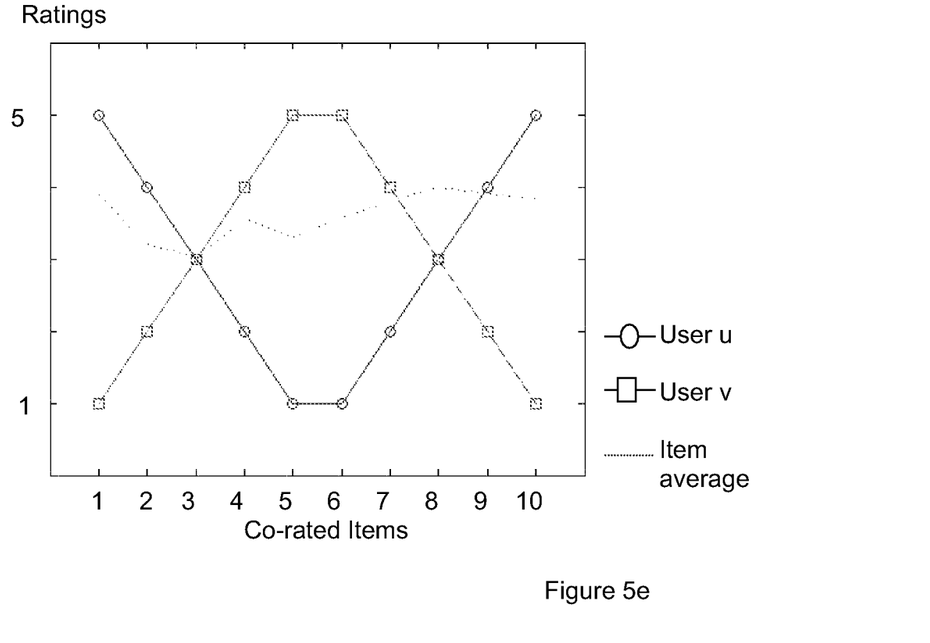

According to yet another alternative scenario, illustrated with reference to FIG. 5e, ratings have been given by two users with preferences that reflects each other. The correlation results for this example read as:

| Cosine | 0.6364 |
|---|---|
| Adjusted cosine | −0.6258 |
| Pearson | −1.0000 |
| Single weight | −0.7072 |
| Double weight | −0.6356 |

Since most preferences of the co-rated items are opposite each other in the latest example, a representative result from such a correlation should instinctively be negative. Also in this case, the double weighted correlation scheme proves to be a reliable alternative.

Figure 5F:
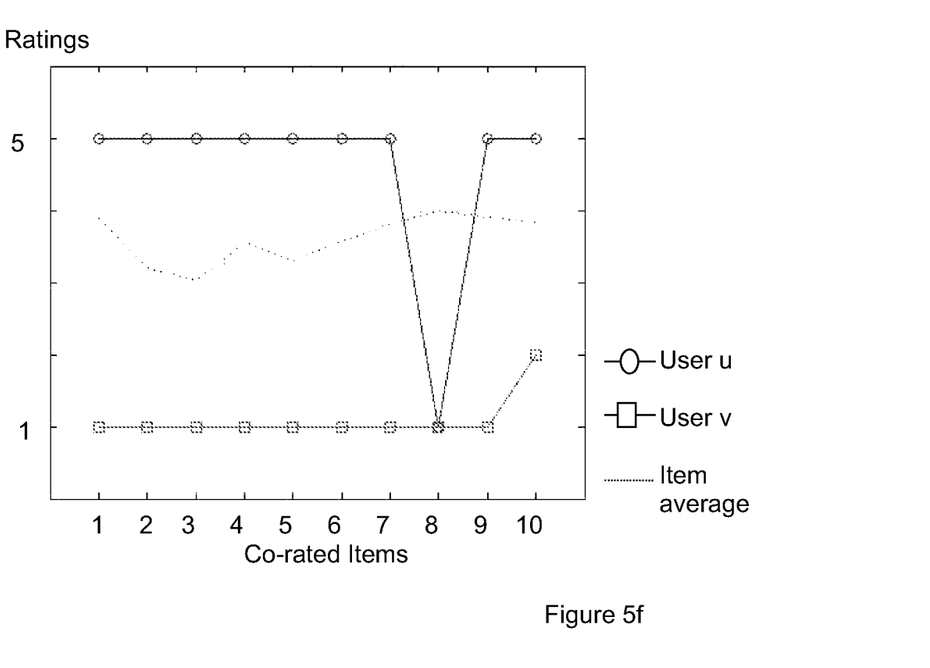

In a further example, illustrated in FIG. 5f, the ratings given by two users are instead opposite, except for one item, for which the ratings given by the two users are equal. This example is an illustration of the suggested double weighted correlation schemes ability to enhance opposite references and to reduce an equal reference. The results for this example are:

| Cosine | 0.9409 |
|---|---|
| Adjusted cosine | −0.5197 |
| Pearson | 0.1111 |
| Single weight | −0.9404 |
| Double weight | −0.8464 |

The relatively large difference between the preferences of the rates given by the two users for the co-rated items in this example is an indication that the correlation should point towards the negative end of the correlation scale. Also in this example this is achieved with the double weighted correlation scheme.

Figure 5G:
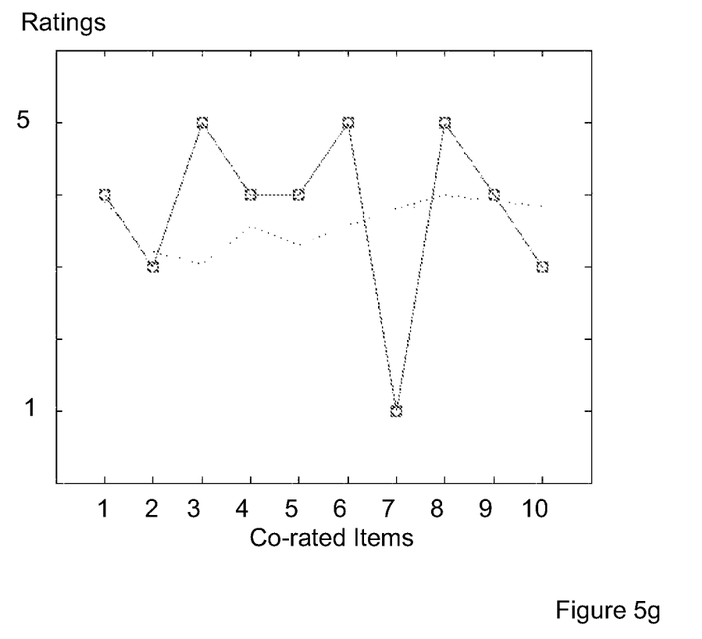

A final example, which exemplifies a series of ratings given by two users which have equal preferences regarding all items of a co-rated set, is illustrated in FIG. 5g. Since the users have equal preferences, the correlation for the co-rated items should be close to one. The result of this correlation is:

| Cosine | 1.0000 |
|---|---|
| Adjusted cosine | 1.0000 |
| Pearson | 1.0000 |
| Single weight | 1.0000 |
| Double weight | 0.9000 |

This example show that the double weighted correlation is accurate also for this type of scenario.

On the basis of the described examples one can draw the conclusions that the proposed correlation scheme is an overall applicable scheme, which is suitable for handling correlations in various situations where there is a considerable risk that other correlation schemes will fail, or give an unreliable result and that the double weighted correlation method is a reliable alternative to prior art correlation methods. As already mentioned, the suggested correlation scheme takes into account the number of items that the calculations are actually based upon. These considerations will abolish the high correlations that other correlation schemes tend to indicate for small sets of co-rated items.

In addition, the suggested correlation scheme will not only take into consideration whether two users have similar deviations compared to the general public's opinion, but also whether or not they deviate from each other.

A realistic resulting correlation will never indicate a perfect correlation between two users, which in reality is impossible to claim, no matter of the size of the set of co-rated items. The suggested double weighted correlation scheme meets with this requirement.

In addition, as indicated in the examples referring to FIGS. 5b and 5f, the proposed double weighted correlation scheme manages to scale down small deviant ratings, and hence to prevent biased results.

According to the results given above, the double weighted correlation scheme also offers a 5-7 percent improvement over a Pearson correlation.

Through out this document, the terms used for expressing functional devices, entities or nodes, such as e.g. "correlation engine", "triggering device" and "recommender", as well as various units of the described devices, entities or nodes, such as e.g. "calculating unit" or "collecting unit" should be interpreted and understood in a broad sense to represent any type of devices, entities, nodes or units which have been adapted to process and/or handle correlation data, accordingly.

In addition, while the invention has been described with reference to specific exemplary embodiments, the description is generally only intended to illustrate the inventive concept and should not be taken as limiting the scope of the invention, which is defined by the appended claims.

The invention claimed is:

1. A method of a correlation engine of determining a correlation between a reference user and a plurality of other users, $v_1 \ldots v_n$, where $n \geq 2$, on the basis of respective sets of ratings, each associated with the respective user, said method comprising the following steps:
   a) recognizing a trigger provided from a triggering entity, for determining a correlation between said users,
   b) collecting from a rating database a first set of user ratings associated with said reference user and a second set of user ratings associated with each of said other users and identifying all co-rated items as a set of co-rated user-pairs for said users,
   c) correlating a set of co-rated user-pairs by applying them in an adjusted cosine correlation function which is weighted by a first and a second weighting function, said first weighting function, compensating for the Euclidean distance of the respective set of ratings and said second weighting function, compensating for high correlations in case said set of co-rated user-pairs is a small set,
   d) storing the result of said correlation in a storing unit,
   e) repeating steps c) and d) for each set of co-rated user pairs, thereby enabling the correlated co-rated user pairs to be used for at least one of ranking and recommendation purposes, wherein
   said first weighting function is defined as:

$$w_1(u,v) = \alpha^{(\delta-\gamma)|R_{u,i}-R_{v,i}|}$$

where u is said reference user, v is said other user, α is a scaling factor, δ is the average of all distances, $|R_{u,i} - R_{v,i}|$, of said co-rated user pair and γ is the median of all possible divergences of said set of co-rated user pairs.

2. A method according to claim 1, wherein said second weighting function is defined as:

$$w_2(u,v) = 1 - \frac{1}{|i \in I_u \cap I_v|}$$

where u is said specified user, v is said second user, and $i \in I_u \cap I_v$ is a set of co-rated items.

3. A method according to claim 1, wherein said correlation function is defined as:

$$\text{corr}(u, v) = \frac{\sum_{i \in I_u \cap I_v} w_1(u, v)(R_{u,i} - \overline{R_i})(R_{v,i} - \overline{R_i})}{\sqrt{\sum_{i \in I_u \cap I_v} w_1(u, v)(R_{u,i} - \overline{R_i})^2 \sum_{i \in I_u \cap I_v} w_1(u, v)(R_{v,i} - \overline{R_i})^2}} \cdot w_2(u, v)$$

where u is said specified user, v is said second user, $R_{u,i}$ is the rate given to an item i by user u, $R_{v,i}$ is the rate given to item i by user v, $w_1(u,v)$ is the first weighting function, $w_2(u,v)$ is the second weighting function, and $\overline{R_i}$ is the average rating of item i.

4. A method according to claim 1, comprising the further step of:
providing said correlations to a requesting entity, enabling said requesting entity to rank said users, $v_1 \ldots v_n$, on the basis of said correlations.

5. A method according to claim 1, wherein said method is triggered from any of a:
PC,
laptop,
PDA,
set-top box, or
a mobile telephone.

6. A correlation system of a communication network for determining a correlation between a reference user and a plurality of other users, $v_1 \ldots v_n$, where n≥2, on the basis of respective sets of ratings, each associated with the respective user, comprising:
a collecting unit for collecting from a rating database a first set of user ratings associated with said reference user and a second set of user ratings associated with each of said other users and for identifying all co-rated items as a set of co-rated user-pairs for said users, in response to having recognized a trigger for determining a correlation between said users,
a calculating unit for correlating a set of co-rated user-pairs by applying them in an adjusted cosine correlation function, said correlating procedure being weighted by a first and a second weighting function, said first weighting function, compensating for the Euclidean distance of the respective set of ratings and said second weighting function, compensating for high correlations in case said set of co-rated user-pairs is a small set, wherein said calculating unit is further adapted to repeat said correlating a first reference user, u and a plurality of other users, $v_1 \ldots v_n$, where n≥2, and
a hardware storing apparatus comprising a non-transitory computer readable medium for storing the result of said correlations, wherein said first weighting function is defined as:

$$w_1(u,v) = \alpha^{(\delta - \gamma)|R_{u,i} - R_{v,i}|}$$

where u is said reference user, v is said other user, α is a scaling factor, δ is the average of all distances, $|R_{u,i} - R_{v,i}|$, of said co-rated user pair and γ is the median of all possible divergences of said set of co-rated user pairs.

7. The correlation system of claim 6, wherein said collecting unit is further adapted to provide said stored correlation results to a requesting entity, enabling ranking of said other users on the basis of said correlations.

8. The correlation system of claim 7, wherein said collecting unit is adapted to collect said ratings from an external database.

9. The correlation system of claim 7, wherein said collecting unit is adapted to collect said ratings from an internal database.

10. The correlation system of claim 6, wherein said collecting unit is adapted to recognize a trigger from any of a:
PC,
laptop,
set-top box, or
mobile telephone.

11. The correlation system of claim 6, wherein said correlation system is a correlation engine.

12. A method of a correlation engine of determining a correlation between a reference user and a plurality of other users, $v_1 \ldots v_n$, where n≥2, on the basis of respective sets of ratings, each associated with the respective user, comprising:
a) recognizing a trigger provided from a triggering entity, for determining a correlation between said users;
b) collecting from a rating database a first set of user ratings associated with said reference user and a second set of user ratings associated with each of said other users and identifying all co-rated items as a set of co-rated user-pairs for said users;
c) correlating a set of co-rated user-pairs by applying them in an adjusted cosine correlation function which is weighted by a first and a second weighting function, said first weighting function, compensating for the Euclidean distance of the respective set of ratings and being defined as:

$$w_1(u,v) = \alpha^{(\delta - \gamma)|R_{u,i} - R_{v,i}|}$$

where u is said reference user, v is said-other user, α is a scaling factor, δ is the average of all distances, $|R_{u,i} - R_{v,i}|$, of said co-rated user pair and γ is the median of all possible divergences of said set of co-rated user pairs, and
said second weighting function, compensating for high correlations in case said set of co-rated user-pairs is a small set;
d) storing the result of said correlation in a storing unit; and
e) repeating steps c) and d) for each set of co-rated user pairs, thereby enabling the correlated co-rated user pairs to be used for ranking or recommendation purposes.

* * * * *

UNITED STATES PATENT AND TRADEMARK OFFICE
CERTIFICATE OF CORRECTION

| | | |
|---|---|---|
| PATENT NO. | : 8,626,772 B2 | Page 1 of 1 |
| APPLICATION NO. | : 13/121214 | |
| DATED | : January 7, 2014 | |
| INVENTOR(S) | : Lidström et al. | |

It is certified that error appears in the above-identified patent and that said Letters Patent is hereby corrected as shown below:

On the Title Page

Item (12), under "United States Patent", in Column 1, Line 1, delete "Lidstrom et al." and insert -- Lidström et al. --, therefor.

Item (75), under "Inventors", in Column 1, Line 1, delete "Lidstrom," and insert -- Lidström, --, therefor.

Item (75), under "Inventors", in Column 1, Line 2, delete "Bjork," and insert -- Björk, --, therefor.

Item (75), under "Inventors", in Column 1, Line 3, delete "Soderberg," and insert -- Söderberg, --, therefor.

In the Drawings

In Fig. 2, Sheet 1 of 7, for Tag "204", in Line 1, delete "Colleting" and insert -- Collecting --, therefor.

In the Claims

In Column 14, Line 45, in Claim 12, delete "said-other" and insert -- said other --, therefor.

Signed and Sealed this
Fifteenth Day of July, 2014

Michelle K. Lee
*Deputy Director of the United States Patent and Trademark Office*